(12) United States Patent
Jardine et al.

(10) Patent No.: US 8,230,252 B2
(45) Date of Patent: Jul. 24, 2012

(54) TIME OF DAY RESPONSE

(75) Inventors: Robert L. Jardine, Cupertino, CA (US); Russell M. Rector, Oakland, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2496 days.

(21) Appl. No.: 10/894,784

(22) Filed: Jul. 20, 2004

(65) Prior Publication Data

US 2006/0031702 A1 Feb. 9, 2006

(51) Int. Cl.
*G06F 1/00* (2006.01)

(52) U.S. Cl. ........................................ 713/500; 709/248

(58) Field of Classification Search .................. 709/205, 709/248; 714/11, 55; 712/28–31; 713/375, 713/502, 500
See application file for complete search history.

(56) References Cited

U.S. PATENT DOCUMENTS

| | | | |
|---|---|---|---|
| 3,909,795 A * | 9/1975 | Chang et al. | 713/502 |
| 4,228,496 A | 10/1980 | Katzman et al. | |
| 5,146,585 A | 9/1992 | Smith, III | |
| 5,226,152 A * | 7/1993 | Klug et al. | 714/12 |
| 5,287,362 A * | 2/1994 | Liencres | 714/55 |
| 5,504,878 A * | 4/1996 | Coscarella et al. | 709/248 |
| 5,572,620 A | 11/1996 | Reilly et al. | |
| 5,590,092 A * | 12/1996 | Fehnel | 368/10 |
| 5,613,127 A | 3/1997 | Schultz | |
| 5,706,425 A * | 1/1998 | Unekawa | 714/55 |
| 6,230,210 B1 * | 5/2001 | Davies et al. | 709/248 |
| 6,397,365 B1 | 5/2002 | Brewer et al. | |
| 6,446,225 B1 * | 9/2002 | Robsman et al. | 714/55 |
| 6,697,925 B1 * | 2/2004 | Federici et al. | 711/167 |
| 7,155,629 B2 * | 12/2006 | Lange-Pearson et al. | 713/500 |

* cited by examiner

*Primary Examiner* — David Lazaro
*Assistant Examiner* — Marie Georges Henry

(57) ABSTRACT

In an implementation of time of day response, time logic executed by each processor element of a logical processor generates a logical time in response to a time of day request. The logical time is generated to approximate the actual time such that each processor element of the logical processor returns the same logical time.

26 Claims, 5 Drawing Sheets

TIME OF DAY RESPONSE

TECHNICAL FIELD

This invention relates to time of day response.

BACKGROUND

Multiple redundant processor systems are implemented as fault-tolerant systems to prevent downtime, system outages, and to avoid data corruption. A multiple redundant processor system provides continuous application availability and maintains data integrity such as for stock exchange systems, credit and debit card systems, electronic funds transfers systems, travel reservation systems, and the like. In these systems, data processing computations can be performed on multiple, independent processing elements of a processor system.

Processors in a multiple redundant processor system can be loosely synchronized in a loose lock-step implementation such that processor instructions are executed at slightly different times. This loosely synchronized implementation provides that the processors can execute instructions faster than a typical tight lock-step configuration because the processors are not restricted to synchronized code execution. However, when an application requests a time of day response to time-annotate a banking or stock transaction, for example, the redundant processors all execute the same instruction set in response to the request, but may all return a different time of day response. The different time responses will appear as an error to the application that has requested the time of day.

BRIEF DESCRIPTION OF THE DRAWINGS

The same numbers are used throughout the drawings to reference like features and components.

DETAILED DESCRIPTION

The following describes embodiments of time of day response. Time of day logic is implemented in a redundant processor system to generate a logical time in response to a time of day request, such as from an application that controls or is implemented in a stock exchange system, a credit and debit card system, an electronic funds transfers system, a travel reservation system, an electronic mail system, cellular telephone application, and the like. The logical time is generated as an approximation of the real time, and such that each processor element of a logical processor in the redundant processor system returns the same logical time in response to a time of day request.

Although a logical time response is only an approximation of the actual time in a loosely-synchronized redundant processor system, it can be a close approximation, such as within a few microseconds, that does not affect the application requesting the time of day. For example, a banking or stock transaction may be recorded to within one second, one-tenth of a second, or even one-hundredth of a second of the transaction time which is determinable from an approximate logical time that is within a few microseconds of the actual time.

Although embodiments of time of day response may be implemented in various redundant processor systems, time of day response is described with reference to the following processing environment in which the actual time can be approximated for loosely-synchronized processor elements. The actual time is approximated as a logical time such that the processor elements do not suffer the performance impact of having to request the actual time from a common source each time that a request for the time of day is received.

Figure 1:
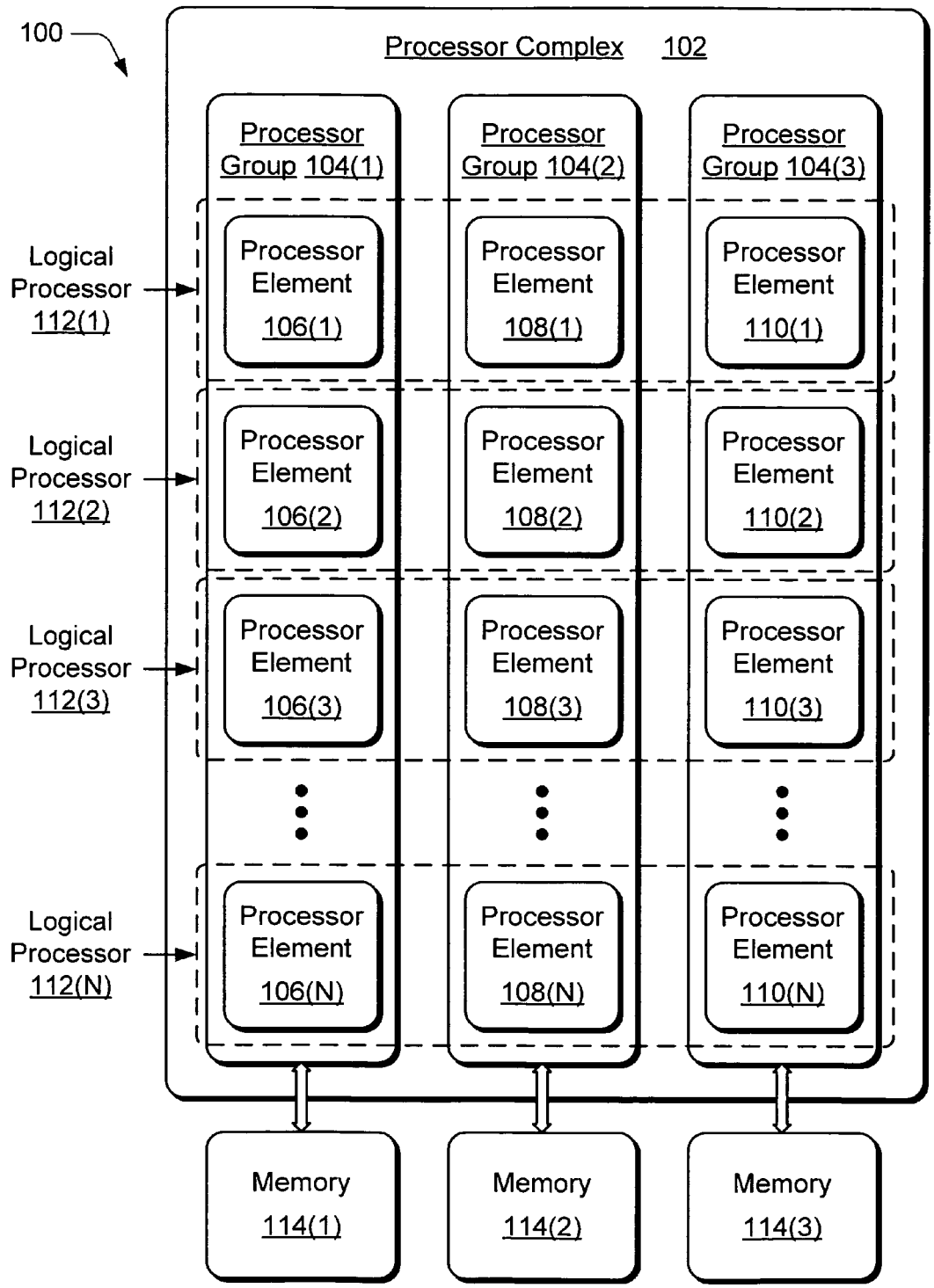
FIG. 1 illustrates an exemplary redundant processor system in which an embodiment of time of day response can be implemented.

FIG. 1 illustrates an example of a redundant processor system 100 in which an embodiment of time of day response can be implemented. The redundant processor system 100 includes a processor complex 102 which has processor groups 104(1-3). Each processor group 104 includes any number of processor elements which are each a microprocessor that executes, or processes, computer executable instructions. Processor group 104(1) includes processor elements 106(1-N), processor group 104(2) includes processor elements 108(1-N), and processor group 104(3) includes processor elements 110(1-N). Although the processor complex 102 includes only three processor groups 104(1-3) in this embodiment of time of day response, a processor complex may include two, four, or any other combination of processor groups.

Processor elements, one each from the processor groups 104(1-3), are implemented together as a logical processor 112(1-N). For example, a first logical processor 112(1) includes processor element 106(1) from processor group 104(1), processor element 108(1) from processor group 104(2), and processor element 110(1) from processor group 104(3). Similarly, logical processor 112(2) includes processor elements 106(2), 108(2), and 110(2), while logical processor 112(3) includes processor elements 106(3), 108(3), and 110(3).

The three processor elements combine to implement a logical processor 112 and cooperate to perform the computations of the logical processor 112. Logical computations for an input/output operation or an interprocessor communication are executed separately three times in a logical processor 112, once each in the three processor elements of the logical processor 112. Additionally, the three processor elements in a logical processor 112 can coordinate and synchronize with each other to exchange data, replicate input data, and vote on input/output operations and communication outputs.

Each processor group 104(1-3) has an associated memory component 114(1-3), respectively. A memory component 114 can be implemented as any one or more memory components, examples of which include random access memory (RAM), DRAM, SRAM, a disk drive, and the like. Although the memory components 114(1-3) are illustrated as independent components, each processor group 104 can include a respective memory component 114 as an integrated component in an alternate embodiment.

In this example, processor complex 102 is a triplex redundant processor system having triple modular redundancy in that each logical processor 112 includes three redundant processor elements. A faulty processor element can be replaced and reintegrated into the system while the redundant processor system 100 remains on-line without a loss of processing capability to provide data integrity.

The processor elements of a logical processor 112 are loosely synchronized in a loose lock-step implementation such that instructions may be executed, or processed, in each of the processor elements at a slightly different time. This implementation provides that the logical processors can execute instructions faster than a typical tight lock-step configuration because the processor elements and logical processors 112 are not restricted to synchronized code execution. This implementation also provides for non-deterministic execution among the processor elements in a logical processor, such as non-deterministic branch prediction, cache replacement algorithms, and the like. The individual processor elements can also perform independent error recovery without losing synchronization with the other processor elements.

Figure 2:
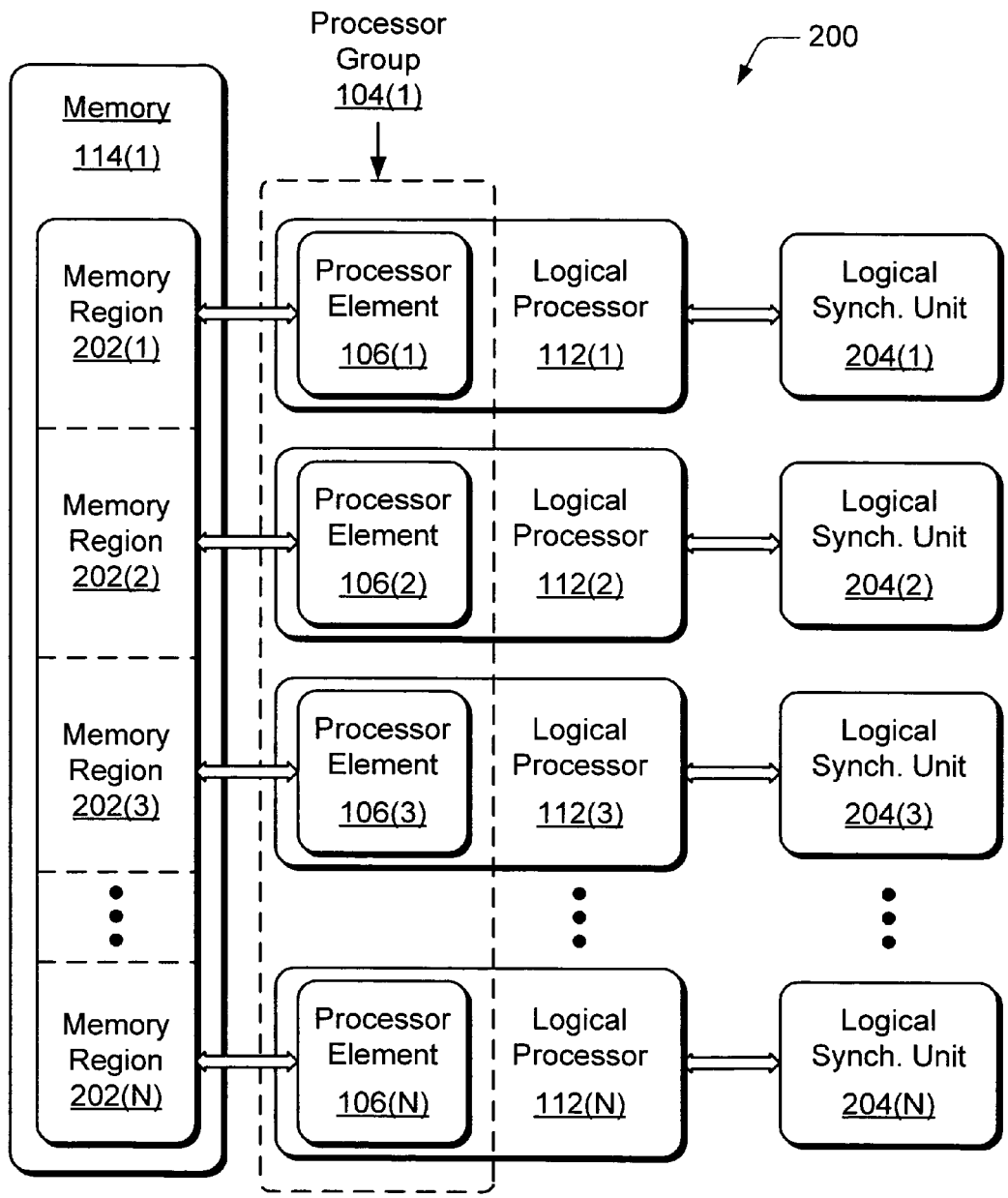
FIG. 2 further illustrates various components of the exemplary redundant processor system shown in FIG. 1.

FIG. 2 further illustrates various components 200 of the redundant processor system 100 shown in FIG. 1. The processor elements 106(1-N) of processor group 104(1) are shown, one each of a respective logical processor 112(1-N). Each processor element 106(1-N) is associated with a respective memory region 202(1-N) of the memory component 114(1) for data storage. The memory component 114(1) associated with processor group 104(1) is partitioned among the processor elements 106(1-N) of the processor group 104(1). In an alternate embodiment, each memory region 202(1-N) can be implemented as an independent, separate memory for data storage. Although not shown, the processor elements 108(1-N) of processor group 104(2) are each associated with a respective partitioned memory region of the memory component 114(2). Similarly, the processor elements 110(1-N) of processor group 104(3) are each associated with a respective partitioned memory region of the memory component 114(3).

Each of the logical processors 112(1-N) correspond to one or more respective logical synchronization units 204(1-N). A logical synchronization unit 204 performs various rendezvous operations for an associated logical processor 112 to achieve agreements on synchronization issues between the processor elements that cooperate to form a logical processor 112. For example, input/output operations and/or interprocessor communications can be communicated from each processor element of a logical processor 112 to an associated logical synchronization unit 204 to compare and vote on the input/output operations and/or interprocessor communications generated by the processor elements.

A rendezvous operation may further be implemented by a logical synchronization unit 204 to exchange state information and/or data among the processor elements of a logical processor 112 to synchronize operations and responses of the processor elements. For example, a rendezvous operation may be implemented such that the processor elements deterministically respond to incoming asynchronous interrupts, to accommodate varying processing rates of the processor elements, to exchange software state information when performing operations that are distributed across the processor elements, and the like.

Figure 3:
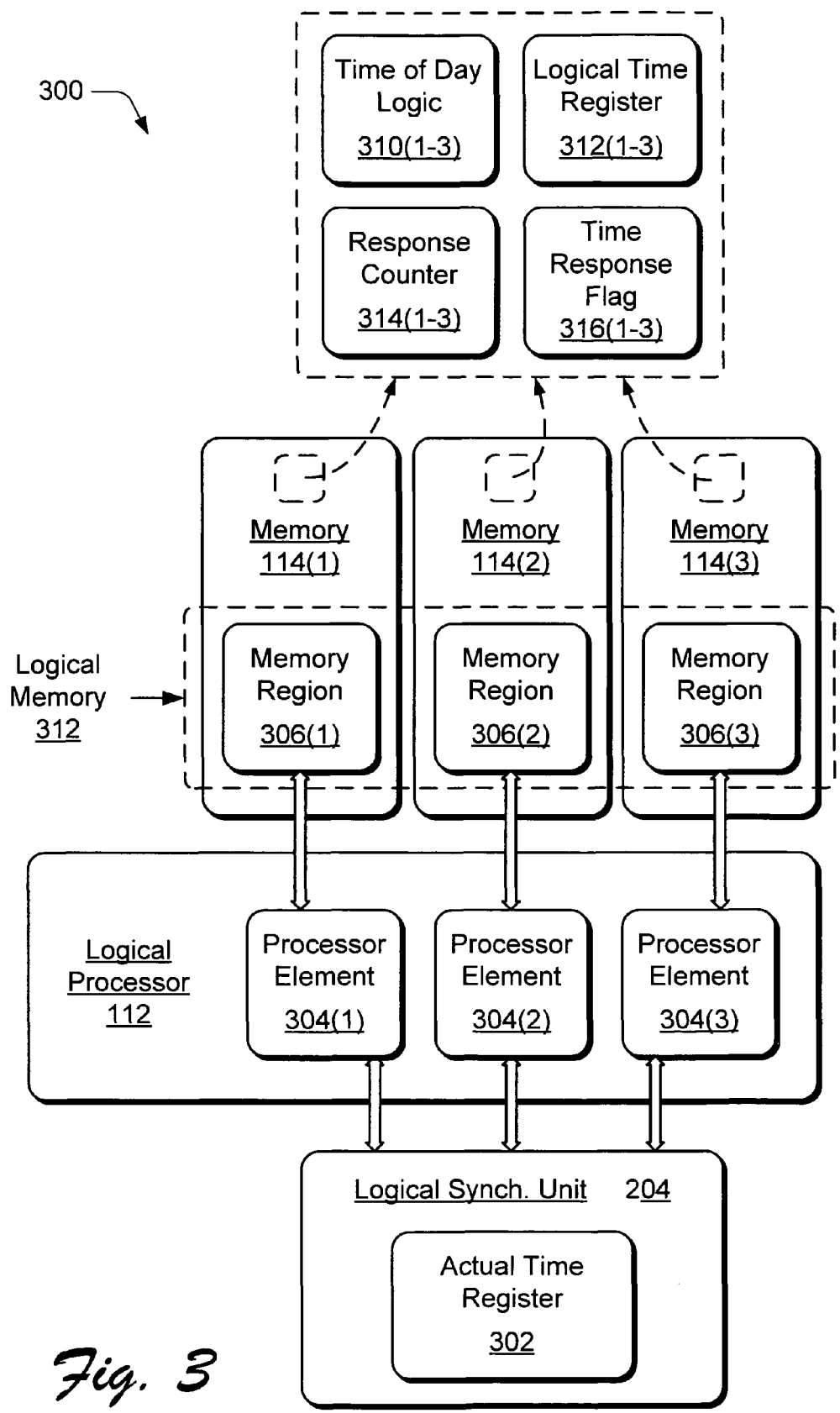
FIG. 3 illustrates various components of an exemplary redundant processor system in which embodiments of time of day response can be implemented.

FIG. 3 illustrates various components of an exemplary redundant processor system 300 in which embodiments of time of day response can be implemented. The redundant processor system 300 includes various components of the redundant processor system 100 shown in FIGS. 1 and 2, such as the multiple logical processors 112(1-N) and the associated logical synchronization units 204(1-N). For illustration, however, only one logical processor 112 and one associated logical synchronization unit 204 is shown in FIG. 3. The logical synchronization unit 204 may be implemented as described with reference to the logical synchronization units 204(1-N) shown in FIG. 2. In this embodiment, the logical synchronization unit 204 includes an actual time register 302 which is a register that consistently increments at a specific frequency, independent of other operations, to track the actual time.

The logical processor 112 includes processor elements 304(1-3) which are each a microprocessor that executes, or processes, computer executable instructions. The redundant processor system 300 includes the memory components 114(1-3) that are each associated with a respective processor group 104(1-3) as shown in FIG. 1. Each of the processor elements 304(1-3) are one of the processor elements in a respective processor group, and each processor element 304 is associated with a partitioned memory region in a respective memory component 114(1-3). For example, processor element 304(1) corresponds to memory region 306(1) in memory component 114(1), processor element 304(2) corresponds to memory region 306(2) in memory component 114(2), and processor element 304(3) corresponds to memory region 306(3) in memory component 114(3).

The memory regions 306(1-3) form a logical memory 308 that corresponds to logical processor 112. The processor elements 304(1-3) of the logical processor 112 each correspond to a respective partitioned memory region 306(1-3) of the logical memory 308.

The memory components 114(1-3) each include time of day logic 310(1-3) that corresponds to a respective processor element 304(1-3) of the logical processor 112. In this example, the time of day logic 310(1-3) is implemented as a software application and is stored in the memory components 114(1-3). Each of the processor elements 304(1-3) execute an instantiation of the time of day logic 310 (e.g., as software) to implement time of day response.

As used herein, the term "logic" (e.g., the time of day logic 310, or components thereof) can also refer to hardware, firmware, software, or any combination thereof that may be implemented to perform the logical operations associated with time of day response. Logic may also include any supporting circuitry utilized to complete a given task including supportive analog operations. For example, logic may also include analog circuitry, memory components, input/output (I/O) circuitry, interface circuitry, power providing/regulating circuitry, and the like.

The time of day logic 310(1-3) generates a logical time in response to a time of day request, such as from an application that time-annotates a banking or stock transaction. The logical time is generated as an approximation of the real, or actual time, and such that each processor element 304(1-3) returns the same logical time in response to a request. Although a logical time response is only an approximation of the actual time, it can be a very close approximation (e.g., within a few microseconds) and does not affect the application that requests the time of day. In practice, a banking or stock transaction can be recorded to within one second, one-tenth of a second, or even one-hundredth of a second of the transaction which is determinable from a logical time that is within a few microseconds of the actual time.

The memory components 114(1-3) also each include logical time registers 312(1-3), response counters 314(1-3), and time response flags 316(1-3) each corresponding to one of the respective processor elements 304(1-3). A logical time register 312 maintains the current logical time, such as the last logical time generated in response to a time of day request. When a time of day request is received, the time of day logic 310 reads the current logical time maintained by the logical time register 312 and, in one embodiment, increments the current logical time and returns the incremented logical time. The time of day logic 310 then stores the incremented logical time as the current logical time (e.g., the last logical time response) in the logical time register 312. The logical time can be incremented by any integer or fraction thereof providing that each processor element 304(1-3) increments the logical time deterministically and returns the same logical time in response to a request. The incremental value of the logical time can be situation, application, and/or implementation specific.

Each time that the time of day logic 310(1-3) corresponding to a respective processor element 304(1-3) responds to a request with a logical time, the time of day logic 310(1-3) increments the respective response counter 314(1-3). The response counter is reset (e.g., to zero, or to a similarly determinable logic state) when the time of day logic 310 obtains the actual time and/or when the actual time is provided, such as from the actual time register 302 in the logical synchronization unit 204. The time of day logic 310(1-3) monitors the respective response counter 314(1-3) and obtains the actual time when the counter meets or exceeds a set number of responses. The number of responses is implementation specific, as well as whether to initiate obtaining the actual time when the counter meets or exceeds the determined number of responses.

The logical synchronization unit 204 provides the actual time from the actual time register 302 when requested from the time of day logic 310(1-3). Alternatively, the logical synchronization unit 204 can provide the time of day when responding to any other synchronization operation, such as interrupt handling for the processor elements 304(1-3).

When the actual time is obtained or received, the time of day logic 310(1-3) determines whether the current logical time maintained by the respective logical time register 312(1-3) is greater than or less than the actual time. If the current logical time is less than the actual time, the respective time response flag 316(1-3) is set to a logic state (e.g., logic state one) and the logical time is set equal to the actual time. When the time of day logic 310(1-3) next responds to a request for the time of day, the current logical time can be incremented to approximate the actual time accordingly. As described above, the current logical time can be incremented by any integer or fraction thereof providing that each processor element 304(1-3) increments the logical time deterministically and returns the same logical time in response to a request. The incremental approximations are implementation specific and can be determined to best approximate and track the actual time with respect to the particular application(s) that may be requesting a time of day response from the redundant processor system 300.

If the current logical time maintained by a logical time register 312(1-3) is greater than the actual time when the actual time is obtained or received, the respective time response flag 316(1-3) is set to a logic state (e.g., logic state zero) to indicate that the current logical time is not to be incremented when the time of day logic 310(1-3) next responds to a request for the time of day. In response to a request for the time of day, the current logical time is returned as a static value (e.g., does not go backwards in time, but may be returned as the same value multiple times which is non-increasing) to allow the actual time to advance up to and/or past the current logical time.

The processor elements 304(1-3) of the logical processor 112 are not clock synchronized and a time of day value generated by one processor element 304 would differ from the other processor elements. The logical synchronization unit 204 maintains the actual time with actual time register 302 from which the processor elements can obtain the actual time. However, applications may request the time of day so often that processor performance in the redundant processor system is degraded when the processor elements continually request and coordinate the actual time from the logical synchronization unit 204. Accordingly, the time of day logic coordinates the processor elements 304(1-3) to respond to time of day requests with a deterministic extrapolated value that is a logical time which represents an approximation of the actual time.

Methods for time of day response, such as exemplary methods 400 and 500 described with reference to FIGS. 4 and 5, respectively, may be described in the general context of computer executable instructions. Generally, computer executable instructions include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
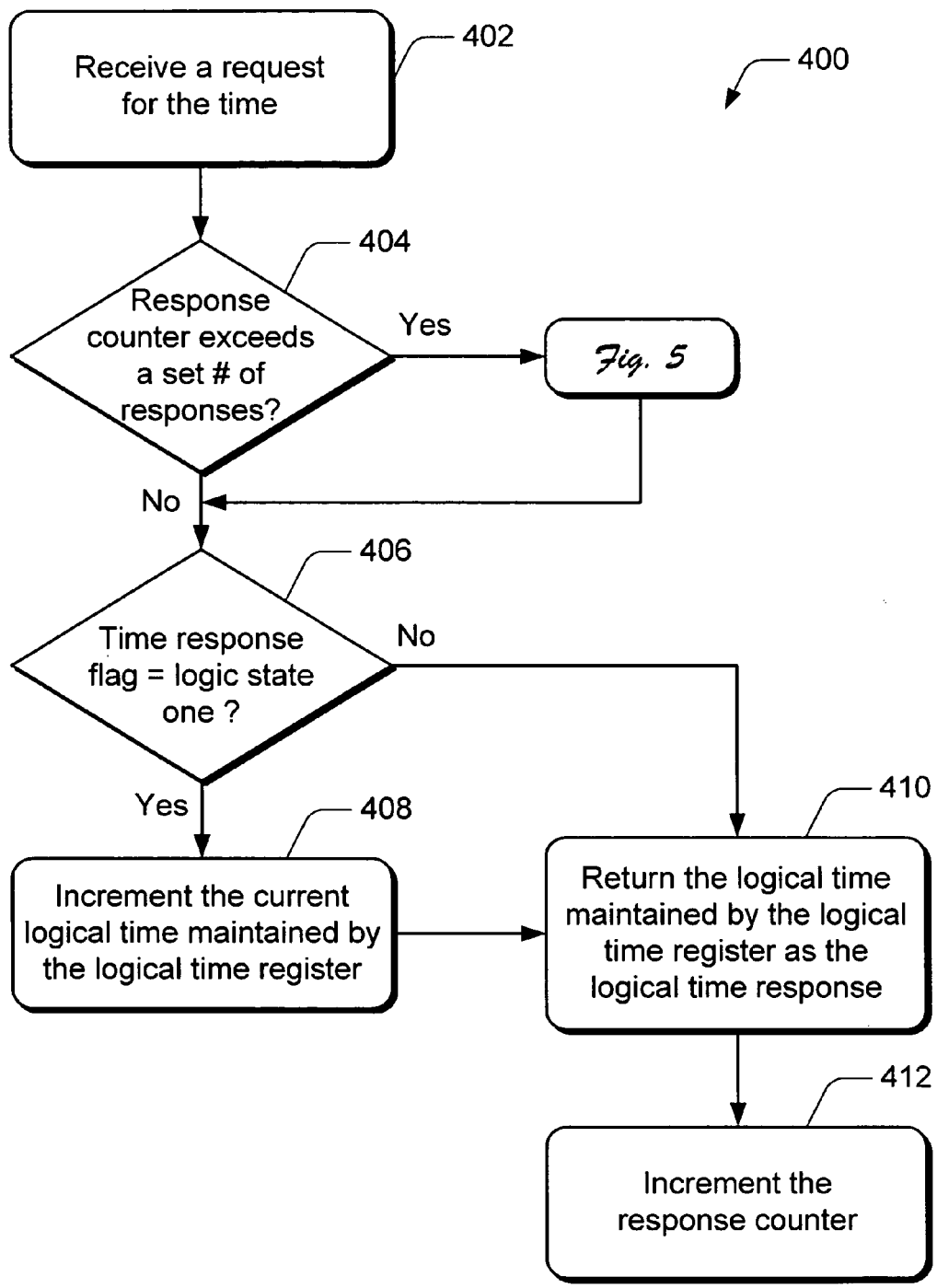
FIG. 4 is a flow diagram that illustrates an embodiment of a method for time of day response.

FIG. 4 illustrates an embodiment of a method 400 for time of day response. The order in which the method is described is not intended to be construed as a limitation, and any number of the described method blocks may be combined in any order to implement the method. Furthermore, the method can be implemented in any suitable hardware, software, firmware, or combination thereof.

At block 402, a request for a time of day is received. In response to the request, the time of day logic 310(1-3) (FIG. 3) generates a logical time to approximate an actual time. At block 404, a determination is made as to whether a response counter exceeds a set number of responses to time of day requests. If the response counter does exceed the set number of responses (i.e., "yes" from block 404), then the method can proceed to FIG. 5 to obtain an actual time update. As described above, the number of responses is implementation specific, as well as whether to initiate obtaining the actual time when the counter meets or exceeds the determined number of responses. When an actual time update is obtained as described with reference to FIG. 5, the method returns to block 406 to respond to the time request received at block 402.

If the response counter does not exceed the set number of responses (i.e., "no" from block 404), then a determination is made as to whether the logic state of the time response flag indicates that the logical time is less than the actual time at block 406. In this example, a logic state one indicates that the logical time is less than the actual time. If the logical time is less than the actual time (e.g., the time response flag indicates a logic one state) (i.e., "yes" from block 406), then the current logical time maintained by the logical time register is incremented at block 408. At block 410, the logical time maintained by the logical time register is returned as the logical time response to the time of day request. In this example, the logical time response is the incremented current logical time from block 408. At block 412, the response counter is incremented. The time of day logic 310(1-3) increments the respective response counter 314(1-3) to track the number of logical time responses.

If the logical time is greater than the actual time (e.g., the time response flag indicates a logic zero state) (i.e., "no" from block 406), then the logical time maintained by the logical time register is returned as the logical time response to the time of day request at block 410. In this example, the logical time is greater than the actual time. Accordingly, the current logical time maintained by the logical time register is not incremented, and the logical time response is the same as for a previous logical time response. This provides that the current logical time is returned as a static value (e.g., does not go backwards in time, but may be returned as the same value multiple times which is non-increasing) to allow the actual time to advance up to and/or past the current logical time. Again, at block 412, the response counter is incremented.

Figure 5:
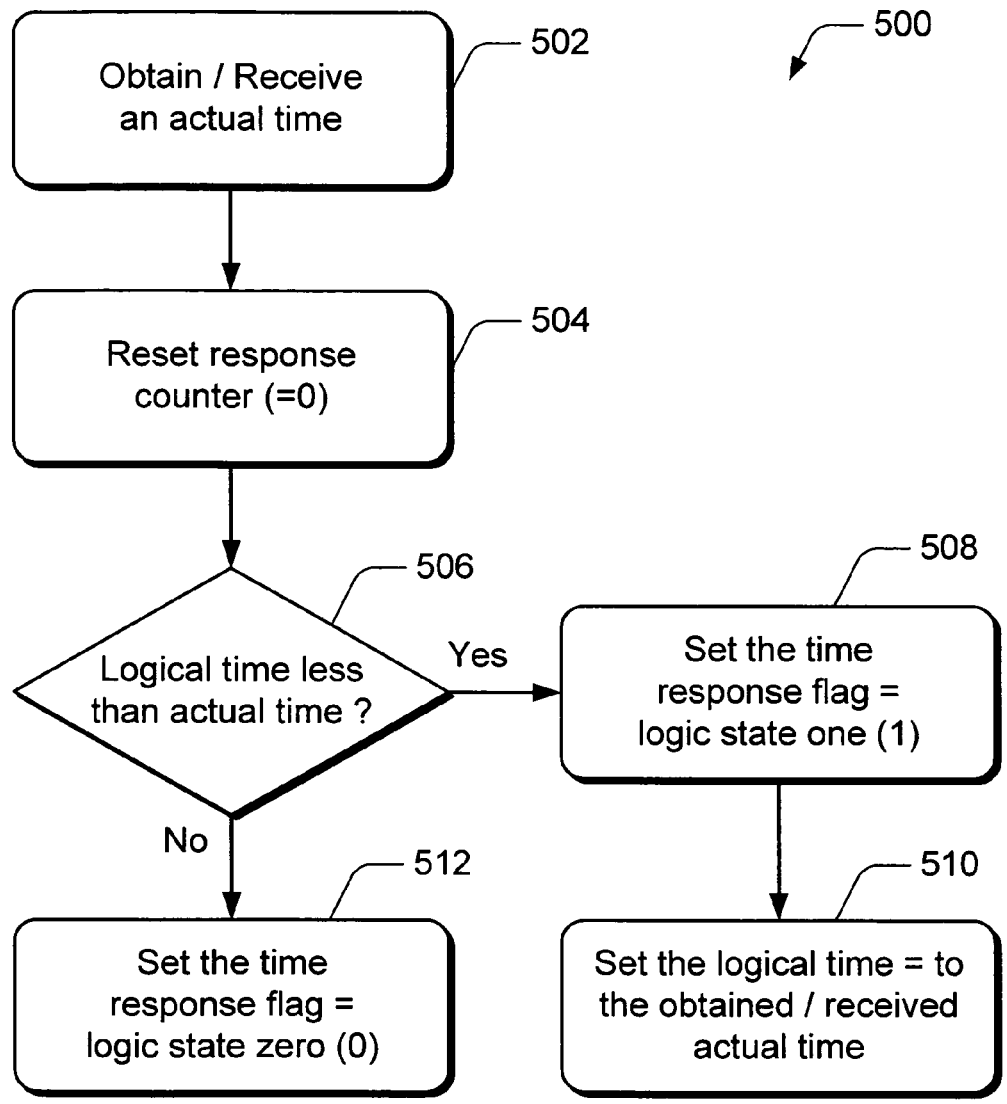
FIG. 5 is a flow diagram that illustrates an embodiment of a method for time of day response.

FIG. 5 illustrates an embodiment of a method 500 for time of day response. The order in which the method is described is not intended to be construed as a limitation, and any number of the described method blocks may be combined in any order to implement the method. Furthermore, the method can be implemented in any suitable hardware, software, firmware, or combination thereof.

At block 502, the actual time is obtained or received. For example, the time of day logic 310(1-3) (FIG. 3) can obtain the actual time of day from the logical synchronization unit 204 which maintains the actual time with actual time register 302. Alternatively, the logical synchronization unit 204 may provide the actual time of day according to actual time register 302 when responding to any other synchronization operation, such as interrupt handling. At block 504, the response counter is reset (e.g., to zero).

At block 506, a determination is made as to whether the logical time is less than the actual time obtained or received at block 502. If the logical time is less than the actual time (i.e., "yes" from block 506), then a time response flag is set to a logic state (e.g., a logic state one) that indicates the logical time is less than the actual time at block 508. In this example, a logic state one indicates that the logical time is less than the actual time. At block 510, the logical time is set equal to the actual time obtained or received at block 502 to update the logical time. In an event that a long duration elapses between requests for the time, the actual time may advance well ahead of the logical time and the logical time is updated accordingly.

If the logical time is not less than the actual time (e.g., the logical time is greater than the actual time) (i.e., "no" from block 506), then the time response flag is set to a logic state (e.g., a logic state zero) that indicates the logical time is greater than the actual time at block 512. In this example, a logic state zero indicates that the logical time is greater than the actual time. The logic state zero of the time response flag is an indication to the time of day logic 310(1-3) for each respective processor element 304(1-3) not to increment the current logical time when a time of day request is received, and to return the non-incremented current logical time.

Although embodiments of time of day response have been described in language specific to structural features and/or methods, it is to be understood that the subject of the appended claims is not necessarily limited to the specific features or methods described. Rather, the specific features and methods are disclosed as exemplary implementations of time of day response.

The invention claimed is:

1. A redundant processor system, comprising:
    a logical processor that includes processor elements;
    time logic executable by each of the processor elements of the logical processor, the time logic configured to generate a logical time in response to a time of day request from a requestor, the logical time being generated to approximate an actual time such that each of the processor elements of the logical processor returns, to the requestor, a same logical time in response to the time of day request, wherein the processor elements of the logical processor are configured to perform computations for the requestor and to coordinate and synchronize with each other, and
    wherein the processor elements of the logical processor all returning the same logical time to the requestor allows the requestor to perform a transaction using the same logical time; and
    logical time registers associated with the respective processor elements, wherein each of the logical time registers is configured to maintain a current logical time, and wherein the time logic executable by each of the processor elements is further configured to determine whether to increment the current logical time in the corresponding logical time register to generate the logical time in response to the time of day request.

2. The redundant processor system as recited in claim 1, wherein the time logic executable by each of the processor elements is further configured to increment the current logical time in the corresponding logical time register by a same amount to generate the same logical time.

3. The redundant processor system as recited in claim 1, wherein the time logic executable by each of the processor elements is further configured to:
    obtain the actual time;
    determine whether the current logical time in the corresponding logical time register is less than the actual time; and
    update the current logical time in the corresponding logical time register to the actual time if the current logical time is less than the actual time.

4. The redundant processor system as recited in claim 1, wherein the time logic executable by each of the processor elements is further configured to:
    obtain the actual time;
    set a corresponding time response flag to a logic state that indicates the current logical time is less than the actual time; and
    update the current logical time in the corresponding logical time register according to the logic state of the corresponding time response flag.

5. The redundant processor system as recited in claim 1, wherein the time logic executable by each of the processor elements is further configured to:
    obtain the actual time;
    set a corresponding time response flag to a logic state that indicates the current logical time is less than the actual time; and
    increment the current logical time in the corresponding logical time register to generate the logical time according to the logic state of the corresponding time response flag.

6. The redundant processor system as recited in claim 1, wherein the time logic executable by each of the processor elements is further configured to:
    obtain the actual time;
    set a corresponding time response flag to a logic state that indicates the current logical time is greater than the actual time; and
    return the current logical time according to the logic state of the corresponding time response flag.

7. The redundant processor system as recited in claim 1, wherein the time logic executable by each of the processor elements is further configured to:
    determine whether a corresponding response counter exceeds a set number of logical time responses;
    obtain the actual time if the corresponding response counter exceeds the set number of logical time responses;

determine whether the current logical time in the corresponding logical time register is less than the actual time; and increment the current logical time in the corresponding logical time register to generate the logical time if the current logical time is less than the actual time.

8. The redundant processor system as recited in claim 1, wherein the time logic executable by each of the processor elements is further configured to:
   determine whether a corresponding response counter exceeds a set number of logical time responses;
   obtain the actual time if the corresponding response counter exceeds the set number of logical time responses;
   determine whether the current logical time in the corresponding logical time register is greater than the actual time; and
   return the current logical time in the corresponding logical time register if the current logical time is greater than the actual time.

9. The redundant processor system as recited in claim 1, further comprising memory components associated with the respective processor elements, wherein each of the memory components includes the respective time logic corresponding to the respective one of the processor elements.

10. A redundant processor system, comprising:
   a logical processor that includes processor elements; and
   time logic executed by each of the processor elements of the logical processor, the time logic configured to generate a logical time in response to a time of day request, the logical time being generated to approximate an actual time such that each of the processor elements of the logical processor returns a same logical time; and
   logical time registers associated with the respective processor elements, each of the logical time registers configured to maintain a current logical time, and wherein the time logic executable by each of the processor elements is further configured to:
      obtain the actual time;
      determine whether the current logical time in the corresponding logical time register is less than the actual time;
      in response to determining that the current logical time in the corresponding logical time register is less than the actual time, increment the current logical time in the corresponding logical time register to generate the same logical time in response to the time of day request, wherein the time logic executed by each of the processor elements is configured to increment the current logical time maintained in the corresponding logical time register by a deterministic amount to produce the same logical time; and
      in response to determining that the current logical time in the corresponding logical time register is not less than the actual time, return the current logical time in the corresponding logical time register as the same logical time in response to the time of day request.

11. A redundant processor system, comprising:
   a logical processor that includes processor elements; and
   time logic executed by each of the processor elements of the logical processor, the time logic configured to generate a logical time in response to a time of day request, the logical time being generated to approximate an actual time such that each of the processor elements of the logical processor returns a same logical time; and
   logical time registers associated with the respective processor elements, each of the logical time registers configured to maintain a current logical time, and wherein the time logic executable by each of the processor elements is further configured to:
      obtain the actual time
      determine whether the current logical time in the corresponding logical time register is less than the actual time;
      in response to determining that the current logical time in the corresponding logical time register is less than the actual time, increment the current logical time in the corresponding logical time register to generate the same logical time in response to the time of day request, wherein the time logic executed by each of the processor elements is configured to increment the current logical time maintained in the corresponding logical time register by a deterministic amount to produce the same logical time;
      in response to determining that the current logical time in the corresponding logical time register is not less than the actual time, return the current logical time in the corresponding logical time register as the same logical time in response to the time of day request;
      determine whether a corresponding response counter exceeds a set number of logical time responses;
      wherein the actual time is obtained in response to the corresponding response counter exceeding the set number of logical time responses; and
      update the current logical time in the corresponding logical time register to the actual time if the current logical time is less than the actual time, wherein the current logical time update is performed prior to the current logical time incrementing.

12. A time response system comprising:
   time logic modules associated with corresponding processor elements of a logical processor, wherein each of the time logical modules is configured to generate a corresponding logical time in response to a time of day request, the logical time being generated to approximate an actual time such that each of the processor elements that executes the corresponding time logic module returns a same logical time in response to the time of day request; and
   logical time registers associated with the respective processor elements, each of the logical time registers configured to maintain a current logical time, wherein each of the time logic modules is further configured to:
      obtain the actual time;
      determine whether the current logical time in the corresponding logical time register is less than the actual time; and
      in response to determining that the current logical time in the corresponding logical time register is less than the actual time, increment the current logical time in the corresponding logical time register to generate the same logical time in response to the time of day request, wherein the time logic module associated with each of the processor elements is configured to increment the current logical time maintained in the corresponding logical time register by a deterministic amount to produce the same logical time; and
      in response to determining that the current logical time in the corresponding logical time register is not less than the actual time, return the current logical time in the corresponding logical time register as the same logical time in response to the time of day request.

13. A time response system comprising:
time logic modules associated with corresponding processor elements of a logical processor, wherein each of the time logical modules is configured to generate a corresponding logical time in response to a time of day request, the logical time being generated to approximate an actual time such that each of the processor elements that executes the corresponding time logic module returns a same logical time in response to the time of day request; and
logical time registers associated with the respective processor elements, each of the logical time registers configured to maintain a current logical time, wherein each of the time logic modules is further configured to:
  obtain the actual time;
  determine whether the current logical time in the corresponding logical time register is less than the actual time; and
  in response to determining that the current logical time in the corresponding logical time register is less than the actual time, increment the current logical time in the corresponding logical time register to generate the same logical time in response to the time of day request, wherein the time logic module associated with each of the processor elements is configured to increment the current logical time maintained in the corresponding logical time register by a deterministic amount to produce the same logical time;
  in response to determining that the current logical time in the corresponding logical time register is not less than the actual time, return the current logical time in the corresponding logical time register as the same logical time in response to the time of day request;
  determine whether a corresponding response counter exceeds a set number of logical time responses;
  wherein the actual time is obtained in response to the corresponding response counter exceeding the set number of logical time responses; and
  update the current logical time in the corresponding logical time register to the actual time if the current logical time is less than the actual time, wherein the current logical time update is performed prior to the current logical time incrementing.

14. A method, comprising:
receiving a time of day request from a requestor;
generating, by time logic executed on each of plural processor elements of a logical processor, a logical time in response to the time of day request, the logical time being generated to approximate an actual time;
returning the logical time such that each of the processor elements of the logical processor returns a same logical time in response to the time of day request;
performing, by the processor elements of the logical processor, computations for the requestor, wherein the processor elements coordinate and synchronize with each other;
using, by the requestor, the same logical time returned by the processor elements to perform a transaction by the requestor;
providing a current logical time in each of logical time registers associated with the respective processor elements; and
determining, by the time logic executed by each of the plural processor elements, whether to increment the current logical time in the corresponding logical time register to generate the logical time in response to the time of day request.

15. The method as recited in claim 14, further comprising:
obtaining the actual time by a corresponding one of the time logic executed on the corresponding processor element;
determining whether the current logical time maintained by the corresponding one of the time logic executed on the corresponding processor element is less than the actual time;
in response to determining that the current logical time maintained by the corresponding one of the time logic executed on the corresponding processor element is less than the actual time, incrementing the current logical time maintained by the corresponding time logic to generate the same logical time in response to the time of day request; and
in response to determining that the current logical time maintained by the corresponding one of the time logic executed on the corresponding processor element is not less than the actual time, returning the current logical time maintained by the corresponding time logic as the same logical time in response to the time of day request.

16. The method as recited in claim 15, further comprising:
determining, by the corresponding one of the time logic, whether a response counter exceeds a set number of logical time responses;
wherein obtaining the actual time is in response to the response counter exceeding the set number of logical time responses;
setting, by the corresponding one of time logic, a time response flag corresponding to each of the processor elements to a logic state that indicates the current logical time maintained by the corresponding one of the time logic is less than the actual time; and
updating, by the corresponding one of time logic, the current logical time to the actual time according to the logic state of the time response flag, wherein the current logical time updating is performed prior to the current logical time incrementing.

17. The method as recited in claim 14, further comprising:
obtaining the actual time;
determining whether the current logical time is less than the actual time; and
incrementing the logical time register corresponding to each of the processor elements to generate the logical time if the current logical time is less than the actual time.

18. The method as recited in claim 14, further comprising:
obtaining the actual time;
determining whether the current logical time is greater than the actual time; and
wherein returning the logical time includes returning the logical time as the current logical time if the current logical time is greater than the actual time.

19. The method as recited in claim 14, further comprising:
obtaining the actual time;
setting a time response flag corresponding to each of the processor elements to a logic state that indicates the current logical time is less than the actual time; and
updating the current logical time to the actual time according to the logic state of the time response flag.

20. The method as recited in claim 14, further comprising:
obtaining the actual time;
setting a time response flag corresponding to each of the processor elements to a logic state that indicates the current logical time is less than the actual time; and incrementing the logical time register corresponding to each of the processor elements to generate the logical time according to the logic state of the time response flag.

21. The method as recited in claim 14, further comprising:
obtaining the actual time;
setting a time response flag corresponding to each of the processor elements to a logic state that indicates the current logical time is greater than the actual time; and
wherein returning the logical time includes returning the logical time as the current logical time according to the logic state of the time response flag.

22. The method as recited in claim 14, further comprising:
updating, by the time logic executed on each of the plural processor elements, a current logical time maintained for each of the plural processor elements by a deterministic amount to produce the same logical time.

23. One or more non-transitory computer-readable media comprising computer executable instructions that, when executed, direct a time response system to:
maintain a current logical time for each of plural processor elements of a logical processor;
receive a time of day request;
generate, for each of the plural processor elements, a logical time to approximate an actual time such that each of the processor elements of the logical processor returns a same logical time in response to the time of day request;
obtain the actual time;
determine whether the current logical time maintained for a corresponding one of the plural processor elements is less than the actual time;
in response to determining that the current logical time maintained for the corresponding one of the plural processor elements is less than the actual time, increment the current logical time maintained for the corresponding one of the plural processor elements to generate the same logical time in response to the time of day request; and
in response to determining that the current logical time maintained for the corresponding one of the plural processor elements is not less than the actual time, return the current logical time maintained for the corresponding one of the plural processor elements as the same logical time in response to the time of day request.

24. The one or more non-transitory computer-readable media as recited in claim 23, further comprising computer executable instructions that, when executed, direct the time response system to, for each of the processor elements, increment the current logical time to generate the logical time, and update the current logical time to the incremented current logical time.

25. The one or more non-transitory computer-readable media as recited in claim 23, further comprising computer executable instructions that, when executed, direct the time response system to:
determine, for the corresponding one of the plural processor elements, whether a response counter exceeds a set number of logical time responses;
wherein obtaining the actual time is in response to the response counter exceeding the set number of logical time responses;
set, for the corresponding one of the plural processor elements, a time response flag to a logic state that indicates the current logical time is less than the actual time; and
update, for the corresponding one of the plural processor elements, the current logical time to the actual time maintained for the corresponding one of the plural processor elements to generate the same logical time according to the logic state of the time response flag.

26. The one or more computer-readable media as recited in claim 23, further comprising computer executable instructions that, when executed, direct the time response system to:
update a current logical time maintained for each of the processor elements by a deterministic amount to produce the same logical time.

* * * * *

UNITED STATES PATENT AND TRADEMARK OFFICE
CERTIFICATE OF CORRECTION

| | | |
|---|---|---|
| PATENT NO. | : 8,230,252 B2 | Page 1 of 1 |
| APPLICATION NO. | : 10/894784 | |
| DATED | : July 24, 2012 | |
| INVENTOR(S) | : Robert L. Jardine et al. | |

It is certified that error appears in the above-identified patent and that said Letters Patent is hereby corrected as shown below:

In the Claims

In column 10, line 4, in Claim 11, delete "time" and insert -- time; --, therefor.

In column 12, line 30, in Claim 16, after "one of" insert -- the --.

In column 12, line 35, in Claim 16, after "one of" insert -- the --.

Signed and Sealed this
Fourteenth Day of May, 2013

Teresa Stanek Rea
*Acting Director of the United States Patent and Trademark Office*